United States Patent Office 3,472,320
Patented Oct. 14, 1969

3,472,320
SECONDARY RECOVERY METHOD USING
ALTERNATE SLUGS OF GAS AND WATER
Alvin B. Dyes, 3721 Northwest Parkway,
Dallas, Tex. 75225
No Drawing. Filed Jan. 27, 1965, Ser. No. 428,574
Int. Cl. E21b 43/20
U.S. Cl. 166—273
30 Claims

ABSTRACT OF THE DISCLOSURE

A method of improving the injectivity of fluids into a subterranean reservoir, utilizing alternate water-gas injection as a medium for driving liquid hydrocarbons from the reservoir, by injecting between the alternate water-gas slugs a fluid having a high degree of solubility in the injected fluid immediately ahead and in the driving fluid which follows the same.

---

The present invention relates to a method for increasing the recovery of oil from a subterranean reservoir. More specifically, the present invention relates to an improved method for utilizing water-gas mixtures to displace oil from subterranean reservoirs.

Many processes have heretofore been proposed to supplement natural oil producing forces during the early life of a subterranean oil reservoir, or to recover additional oil from such a reservoir after the natural recovery forces have been substantially depleted. One such recovery method involves the injection of gases, such as, natural gas, carbon dioxide, nitrogen, flue gas, air and the like. Such gases have heretofore been utilized in direct contact with the reservoir oil to maintain sufficient pressure on the reservoir oil to permit the natural solution gas drive forces to push oil to the surface of the earth. Under such low pressure conditions, the gas is generally immiscible with the reservoir oil and simply acts as a medium to maintain the pressure, to some extent, as a pusher to displace the reservoir oil, and, ultimately, as a cheap material to fill space in the reservoir which has been voided by the recovery of oil. In more recent years, several processes have been proposed wherein such gases are injected at extremely high pressures whereby the gas, in contact with the reservoir oil, builds up a zone of miscibility at the contact between the oil and gas and ultimately displaces the oil by a miscible displacement mechanism. This miscible displacement technique is much more efficient than a low pressure immiscible displacement. Processes of this latter category include the High Pressure Gas Process, as set forth in United States Patents 2,724,437 and 2,724,438, and the Condensing Gas Drive Process, as set forth in Patent 2,880,801.

In addition to the processes mentioned above, which utilize gas in direct contact with the reservoir oil, there are in existence processes which utilize gas as a back-up or ultimate driving fluid after a primary displacement fluid has been injected. Here again, gas is utilized as the ultimate displacing fluid and in substantially greater volumes than the primary displacing fluid because it is less expensive than the primary displacing fluid. For example, the previously mentioned High Pressure Gas Process and the previously mentioned Condensing Gas Drive Process can each be operated by first injecting a small amount or slug, usually from 10 to 100% of the pore volume, of a so-called active gas, such as natural gas rich in $C_2$ to $C_6$ components, in order to create miscibility with reservoir oil at a relatively low pressure and then follow this slug of gas with a still less expensive gas, such as, flue gas, which ordinarily would require a higher pressure to attain miscibility. Likewise, it has been proposed to inject a normally gaseous material, such as carbon dioxide, in a small volume or slug, either under a pressure which renders the carbon dioxide miscible with the reservoir oil or under immiscible conditions, and then to follow this relatively expensive material with an inexpensive gas, such as natural gas or flue gas. Finally, it has also been proposed to carry out what has commonly become known as the Miscible Slug Process, by injecting a small volume or slug, for example, 0.01 to 10% of the hydrocarbon pore volume of the reservoir, of a material which is substantially completely miscible with the reservoir oil and with an ultimate driving fluid. In the more popular version of the Miscible Slug Process, the primary driving fluid or slug is a normally gaseous material which is liquid under the operating pressure of the reservoir. Such materials include liquefied propane, liquefied butane and mixtures of these materials, normally referred to as LPG. The normally gaseous slug material can thereafter be followed by any of the previously mentioned gases, the only criterion being that the pressure at which the slug material and the gas are injected is sufficient to maintain the gas miscible with the liquefied slug material. While the mechanism of attaining or maintaining miscibility between the liquefied slug and the ultimate displacing fluid or gas is substantially the same as that of the previously mentioned High Pressure Gas Process, one can attain miscibility at a substantially lower pressure in the Miscible Slug Process.

In all of the processes previously mentioned, whether of the immiscible or the miscible variety, where gas is employed in substantial quantities as a driving fluid, it is a known fact that the gas, because of its high mobility or rate of travel through a reservoir, tends to contact only a very limited area of the reservoir. For example, in any of the process previously mentioned, where gas is used in appreciable quantities, the injected gas or, in fact, all of the injected fluids, will ultimately contact in the neighborhood of 40% of the area of the reservoir. This, of course, results in inefficient recovery even in those cases where miscible displacement is practiced and the recovery in the area contacted is essentially 100%. Accordingly, it has heretofore been proposed that water be injected concurrently or simultaneously with the gas in order to increase the areal sweep of the reservoir. Specifically, a mixture of water and gas is injected either by mixing the gas and water prior to injection into the subsurface formation or by alternately injecting small slugs of water and gas in proportions such that the two mix in the formation and thus ultimately result in a two-phase flowing mixture of gas and water. The latter type of operation is obviously more practical, since it is difficult to premix gas and water in the proportions necessary to function as a two-phase displacing medium; and it is the latter technique to which the present invention is directed. It is, of course, also known to those skilled in the art that even where complete mixing of the alternate slugs of gas and water do not occur or do not occur until the two approach the producing well, definite advantages and obtained by the alternate injection of slugs of water and gas. By injection of alternate slugs of water and gas, the area of a reservoir contacted by the displacing fluids in any of the previously mentioned recovery processes can be substantially increased and in the most efficient of these processes the areal sweep can be increased to near 100%. Thus, where such improved areal sweep is combined with the essentially 100% recovery of miscible displacement processes the ultimate recovery of oil from the reservoir will approach 100%. A process which utilizes this combination of miscible displacement and the injection of water-gas mixtures is described in detail in United States Patent 3,096,821 to the present inventor.

While, as previously indicated, a simultaneous or concurrent injection of water and gas achieves an improved sweep of the reservoir, the use of this technique is limited in many cases. To recognize the limitations of this technique, one must look at the theoretical mode of operation of the technique. The effectiveness or the increase in areal sweep obtained by the simultaneously use of water and gas is primarily due to the reduced or lowered mobility of the fluids in the water-gas region. However, this low mobility leads to an undesirable reduction in the injection rate of the fluids per unit of pressure applied. This reduction in injectivity has been demonstrated by model performance in the laboratories, by theoretical calculations, and also by actual experience in the field. Obviously, such reduced injectivity, particularly the reduced injectivity of water, limits the use of the technique to highly permeable reservoirs where a reduction in injectivity will not interfere with or prevent the injection of water. In addition, excessive pressures are necessary in those reservoirs where it is possible to operate the process. If, however, the injectivity of the water, the injectivity of the gas, or the injectivity of both the water and gas can be improved without affecting the performance of the process or the ultimate recovery of oil, the process would be substantially improved, its flexibility increased, and its applicability to a larger variety of reservoirs increased.

It is therefore an object of the present invention to provide an improved method for the recovery of oil from subterranean reservoirs.

A further object of the present invention is to provide an improved method for the recovery of oil from subterranean reservoirs by the injection of gas.

Another object of the present invention is to provide an improved method for the recovery of oil from subterranean reservoirs by the injection of water-gas mixtures.

Still another object of the present invention is to provide an improved method for the recovery of oil from subterranean reservoirs wherein the injectivity of injected fluids is improved.

Another and further object of the present invention is to provide an improved method for the recovery of oil from subterranean reservoirs wherein the injectivity of water is improved in a technique involving the injection of water-gas mixtures.

Yet another object of the present invention is to provide an improved method for the recovery of oil from a subterranean reservoir wherein the injectivity of gas is improved in a technique involving the injection of water-gas mixtures.

A further object of the present invention is to provide an improved method for the recovery of oil from a subterranean reservoir wherein the injectivity of both water and gas is improved in a technique involving the injection of water-gas mixtures.

Another and further object of the present invention is to provide an improved method for the recovery of oil from a subterranean reservoir wherein the injectivity of injected fluids is improved in a technique for immiscibly displacing oil with water gas mixtures.

A still further object of the present invention is to provide an improved method for the recovery of oil from a subterranean reservoir wherein the injectivity of injected fluids is improved in a technique for miscibly displacing oil by water-gas mixtures.

Yet another object of the present invention is to provide an improved method for the recovery of oil from a subterranean reservoir wherein a fluid having a high degree of solubility in water and gas is injected between alternate slugs of water and gas.

A further object of the present invention is to provide an improved method for the recovery of oil in a subterranean reservoir wherein a material which is miscible with water or gas or both is injected between alternate slugs of water and gas.

These and other objects and advantages of the present invention will be obvious from the following detailed description.

Briefly, in accordance with the present invention, the injectivity of fluids into a subterranean reservoir is improved in processes utilizing alternate water-gas injection by interposing between the slugs of water and gas a fluid having a high degree of solubility in the injected fluid immediately ahead and in the driving fluid which follows. In the preferred method of practicing the present invention, a fluid having a high degree of solubility in water and gas is injected following the injection of the gas slug but before the injection of the water slug, in a technique for the alternate injection of gas and water slugs. In an even more specific and the most preferable form of the present invention, a fluid having a high degree of solubility in water and gas is injected after the injection of gas slugs and before the injection of water slugs in miscible displacement processes utilizing alternate slugs of water and gas as a driving medium, in particular, those processes set forth in United States Patent 3,096,821. Thus the present invention covers both miscible displacement processes as indicated in applicant's prior U.S. Patent No. 3,096,821 and immiscible displacement processes in which a plurality of alternate slugs of water and gas are used as a driving medium.

As previously indicated, the greatest benefit is obtained, in accordance with the present invention, by injecting a fluid having a high degree of solubility in water and gas prior to the injection of each water slug or prior to at least one of the water slugs. This technique of injecting the fluid prior to rather than after the water slug is preferred, since it is the water mobility which is most seriously affected in alternate water-gas injection and it is in the injectivity of water where the greatest improvement can be obtained. Also, as previously indicated, the fluid employed should have a high degree of solubility in water and gas, preferably at least about 50%. Where the intermediary material is injected prior to a slug of water, the intermediary material is preferably substantially completely soluble or miscible in the water, or the gas, in addition to being highly soluble in the other material in question. Obviously, still better results will be obtained where the intermediary material is miscible with both the water and the gas. While a relatively smaller improvement in injectivity will result, the present invention also contemplates injection of an intermediary material having a high degree of solubility in gas and water after the injection of a water slug and before the injection of a gas slug. As was the case where the intermediary material preceded a water slug, where the intermediary material precedes a gas slug it is preferably miscible with gas or miscible with water, in addition to its high degree of solubility with the other material with which it is in contact. Also, as was the previous case, an intermediary material may be utilized which is miscible with both the gas and the water. It will also be quite obvious to one skilled in the art that the most outstanding results will be obtained in the intermediary material is injected both after the gas slug and before the water slug, and after the water slug and before the gas slug. In this case, the same solubility and miscibility relationships, as previously set forth, are applicable. The intermediary material may be a liquid or a gas. Examples of liquid materials of the character described include: primarily the alcohols, ketones and certain aldehydes. Specific examples are: methyl alcohol, butyl alcohol, isopropyl alcohol, normal propyl alcohol, allyl alcohol, ethyl alcohol, diacetone alcohol, acetone, butyl Cellosolve, butyl carbitol, diosane, nitrobenzene, furfural, nitropropane and the like. Gases which exhibit the requisite properties of high solubility in water and gas include: carbon dioxide, hydrogen sulfide and the like.

The ratio of water to gas, as well as the sizes of the respective slugs of water and gas which will result in concurrent or two-phase flow of water and gas, are the same as those previously defined in United States Patent 3,096,821. The subject patent sets forth in detail a method of determining the ratio of water to gas to be employed in any given reservoir and utilizing any given combination of materials. Generally, however, as set forth in said patent, the volumetric ratio of water to gas at reservoir operating conditions should be between about 0.5 and 5. Also, the subject patent sets forth a method for determining the maximum size of the slugs of water and gas which may be injected. Specifically, when one has determined the ratio of water to gas to be employed, the total number of unit volumes of water and gas are divided into the volume of oil produced at breakthrough for the process under consideration in order to determine the maximum size slug of gas and water to be injected if only one slug of each is utilized. Specifically, if it is determined that a water to gas ratio of 1.5 is to be employed in a process where the volume of oil produced at breakthrough is anticipated to be 40% of the pore volume, a gas slug equal to 16% of the pore volume and a water slug equal to 24% of the pore volume would be injected. Preferably, such large slugs would not be employed, but instead a plurality of alternate slugs of much smaller size but in the same general proportions would be used in order to obtain the maximum benefit which can be gained by the utilization of water-gas mixtures. In any event, the techniques for determining the water to gas ratio to be employed and the sizes of the water and gas slugs, as set forth in Patent 3,096,821, can be used in either the miscible processes set forth in the subject patent or in the immiscible processes. Also, as previously indicated, some benefit may be derived by injecting all of the slugs of water and gas in ratios other than those set forth in the subject patent, and by using slug sizes other than those set forth. For example, slugs of water and gas which do not mix completely before reaching the producing well will be of some value in increasing recovery and this process can be improved by the present invention. Accordingly, the present invention is applicable to any process in which alternate slugs of water and gas are to be injected.

The volume of intermediary material to be employed in accordance with the present invention is extremely small even as compared with the relative volumes of the slugs of water and gas employed. It has been found that the minimum volume of intermediary material employed may preferably be 0.001% and seldom need exceed 0.5% of the pore volume of the reservoir in order to produce a highly unexpected improvement in injectivity. Such extremely small amounts of intermediary material have been found effective in producing injectivity increases as great as 70%, and even as great as 15% in instances where the well has been fractured and thus is highly permeable or has a rather large effective bore diameter. While it is not intended to limit the present invention in accordance with any particular theory of operation, it is believed that the effectiveness of the present invention is due to the removal of residual immiscible material adjacent the well bore prior to the injection of a particular slug of material. In other words, the intermediary material appears to sweep residual gas away from the well bore and then in turn be itself miscibly displaced or absorbed by the water when the slug of water is subsequently injected. For example, in the immediate vicinity of the well bore a residual gas saturation of approximately 28% and a relative permeability to water of about 0.42 may exist. Removal of all of the gas in this area would make the relative permeability to water 1.0 and thereby increase the conductivity to water by more than twice what it would have been. In addition, since areal flow occurs from the well bore outwardly into the formation, much of the resistance to the flow of fluids through the formation occurs immediately adjacent the well bore. Therefore, it has been found that by reducing substantially or completely the saturation of immiscible fluid in a small annular section of formation immediately surrounding the well bore, preferably between about 15 and 100 feet radially about the well bore, all of the benefits of the present invention may be attained without seriously affecting the ultimate areal sweep of the reservoir and the ultimate production. Since most wells are normally spaced anywhere from 500 to 2000 feet from one another, it is to be seen that the treatment of a very small part of the reservoir adjacent the injection wells with the intermediary material of the present invention produces a highly unexpected increase in the injectivity of the fluid injected after such treatment.

While specific examples have been included for purposes of illustration and theoretical explanations have been set forth to aid in describing the invention, it is to be understood that such examples and theories are not to be considered limiting. Accordingly, the present invention is to be limited only by the appended claims.

I claim:

1. In a method of increasing the recovery of oil from a subterranean reservoir, having in communication therewith at least one injection well and at least one production well, wherein a plurality of alternate slugs of gas which remains gaseous at reservoir conditions and water are utilized as a displacing medium, the improvement, comprising: injecting into said reservoir through said injection well, following the injection of each slug of gas and before the injection of each slug of water, a small amount not greater than about 0.5% of the pore volume of the reservoir of a first intermediary fluid miscible with both said water and said gas under the reservoir pressure maintained during the operation of the recovery method; and, injecting into said reservoir through said injection well, following the injection of each slug of water and before the injection of each slug of gas, a small amount not greater than about 0.5% of the pore volume of the reservoir of a second intermediary fluid miscible with both said gas and said water under the reservoir pressure maintained during the operation of the recovery method.

2. In a method of increasing the recovery of oil from a subterranean reservoir, having in communication therewith at least one injection well and at least one production well, wherein a plurality of alternate slugs of water and gas which remains gaseous at reservoir conditions are utilized as a displacing medium, the improvement, comprising: injecting into said reservoir through said injection well, immediately before the injection of each slug of water, a small slug of a first intermediary fluid having a high degree of solubility in said water and said gas; and, injecting into said reservoir through said injection well, immediately before the injection of each slug of gas, a small slug of a second intermediary fluid having a high degree of solubility in said gas and said water.

3. A method in accordance with claim 2 wherein the solubility of the first intermediary fluid in the water is sufficiently high that said first intermediary fluid and said water are miscible with one another.

4. A method in accordance with claim 2 wherein the solubility of the second intermediary fluid in the gas is sufficiently high that said second intermediary fluid and said gas are miscible with one another.

5. A method in accordance with claim 2 wherein the solubility of the first intermediary fluid in the water is sufficiently high that said first intermediary fluid and said water are miscible with one another and the solubility of the second intermediary fluid in the gas is sufficiently high that said second intermediary fluid and said gas are miscible with one another.

6. A method in accordance with claim 2 wherein the solubility of the first intermediary fluid in the gas is sufficiently high that said first intermediary fluid and said gas are miscible with one another.

7. A method in accordance with claim 2 wherein the solubility of the second intermediary fluid in the water is sufficiently high that said second intermediary fluid and said water are miscible with one another.

8. A method in accordance wtih claim 2 wherein the solubility of the first intermediary fluid in the gas is sufficiently high that said first intermediary fluid and said gas are miscible with one another and the solubility of the second intermediary fluid in the water is sufficiently high that said second intermediary fluid and said water are miscible with one another.

9. A method in accordance with claim 2 wherein the solubility of the first intermediary fluid in water and in the gas is sufficiently high that said first intermediary fluid is miscible with both said water and said gas.

10. A method in accordance with claim 2 wherein the solubility of the second intermediary fluid in the gas and in the water is sufficiently high that said second intermediary fluid is miscible with both said gas and said water.

11. A method in accordance with claim 2 wherein the solubility of said first intermediary fluid in the water and in the gas is sufficiently high that said first intermediary fluid is miscible with both said water and said gas; and the solubility of the second intermediary fluid in the gas and in the water is sufficiently high that said second intermediary fluid is miscible with both said gas and said water.

12. A method in accordance with claim 2 wherein the slugs of the first and second intermediary fluids are sufficient in volume to displace a substantial portion of the residual fluid, injected immediately ahead of said slugs of first and second intermediary fluids, from a small annular section of the reservoir up to a radial dimension of about 100 feet.

13. A method in accordance with claim 2 wherein the displacing medium in immediate contact with the main body of reservoir oil is miscible with the reservoir oil.

14. A method in accordance with claim 2 wherein the displacing medium in immediate contact with the main body of reservoir oil is immiscible with the reservoir oil.

15. A method in accordance with claim 2 wherein the first and the second intermediary fluids are the same material.

16. A method in accordance with claim 2 wherein the first and the second intermediary fluids are different materials.

17. In a method in increasing the recovery of oil from a subterranean reservoir, having in communication therewith at least one injection well and at least one production well, wherein a plurality of alternate slugs of water and gas which remains gaseous at reservoir conditions are used as a displacing medium, the improvement, comprising: injecting into said reservoir through said injection well, immediately before the injection of each slug of water, a small slug of an intermediary fluid having a high degree of solubility in said water and said gas.

18. A method in accordance with claim 17 wherein the solubility of the intermediary fluid in the water is sufficiently high that said intermediary fluid and said water are miscible with one another.

19. A method in accordance with claim 17 wherein the solubility of the intermediary fluid in the gas is sufficiently high that said intermediary fluid and said gas are miscible with one another.

20. A method in accordance with claim 17 wherein the solubility of the intermediary fluid in the water and in the gas is sufficiently high that said intermediary fluid is miscible with both said water and said gas.

21. A method in accordance with claim 17 wherein the slug of the intermediary fluid is sufficient in volume to displace a substantial portion of the residual fluid, injected immediately ahead of said slug of intermediary fluid, from a small annular section of the reservoir up to a radial dimension of about 100 feet.

22. A method in accordance with claim 17 wherein the displacing medium in immediate contact with the main body of reservoir oil is miscible with the reservoir oil.

23. A method in accordance with claim 17 wherein the displacing medium in immediate contact with the main body of oil is immiscible with the reservoir oil.

24. In a method of increasing the recovery of oil from a subterranean reservoir, having in communication therewith at least one injection well and at least one production well, wherein a plurality of alternate slugs of water and gas which remains gaseous at reservoir conditions are utilized as a displacing medium, the improvement, comprising: injecting into said reservoir through said injection well, immediately before the injection of each slug of gas, a small slug of an intermediary fluid having a high degree of solubility in said gas and said water.

25. A method in accordance with claim 24 wherein the solubility of the intermediary fluid in the gas is sufficiently high that said intermediary fluid and said gas are miscible with one another.

26. A method in accordance with claim 24 wherein the solubility of the intermediary fluid in the water is sufficiently high that the intermediary fluid and the water are miscible with one another.

27. A method in accordance with claim 24 wherein the solubility of the intermediary fluid in the gas and in the water is sufficiently high that said intermediary fluid is miscible with both said gas and said water.

28. A method in accordance with claim 24 wherein the slug of the intermediary fluid is sufficient in volume to displace a substantial portion of the residual fluid, injected immediately ahead of said slug of intermediary fluid, from a small annular section of the reservoir up to a radial dimension of about 100 feet.

29. A method in accordance with claim 24 wherein the displacing medium in immediate contact with the main body of reservoir oil is miscible with the reservoir oil.

30. A method in accordance with claim 24 wherein the displacing medium in immediate contact with the main body of reservoir oil is immiscible with the reservoir oil.

References Cited

UNITED STATES PATENTS

| | | | |
|---|---|---|---|
| 3,096,821 | 7/1963 | Dyes | 166—9 |
| 3,110,344 | 11/1963 | Pelzer et al. | 166—9 |
| 3,311,167 | 3/1967 | O'Brien et al. | 166—9 |
| 1,658,305 | 2/1928 | Russell | 166—9 |
| 2,669,307 | 2/1954 | Mulholland et al. | 166—9 |
| 3,084,743 | 4/1963 | West et al. | 166—9 |
| 3,207,217 | 9/1965 | Woretz | 166—9 |
| 3,244,228 | 4/1966 | Parrish | 166—9 |
| 3,249,157 | 5/1966 | Brigham et al. | 166—9 |

CHARLES E. O'CONNELL, Primary Examiner

I. A. CALVERT, Assistant Examiner